Patented Dec. 14, 1926.

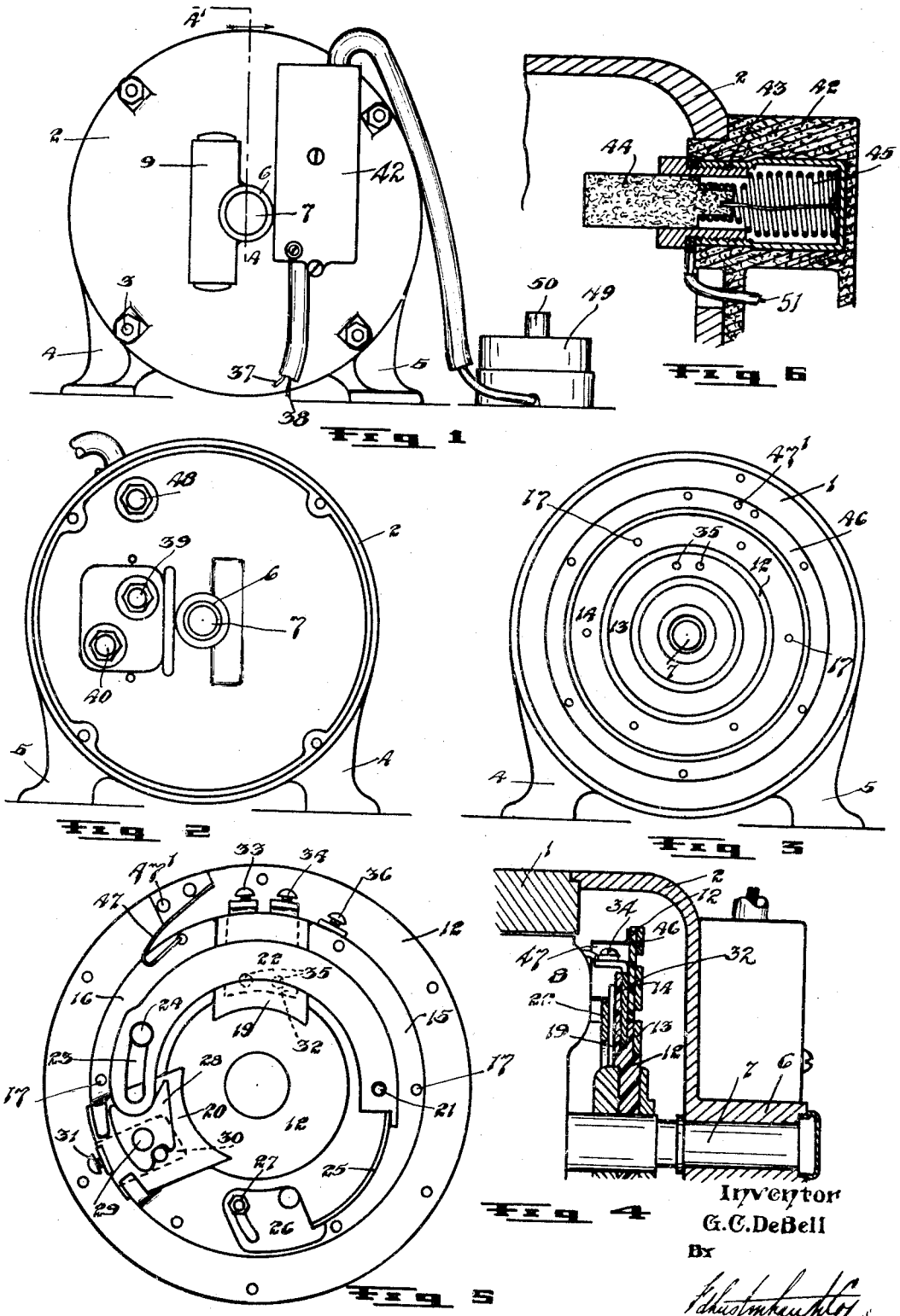

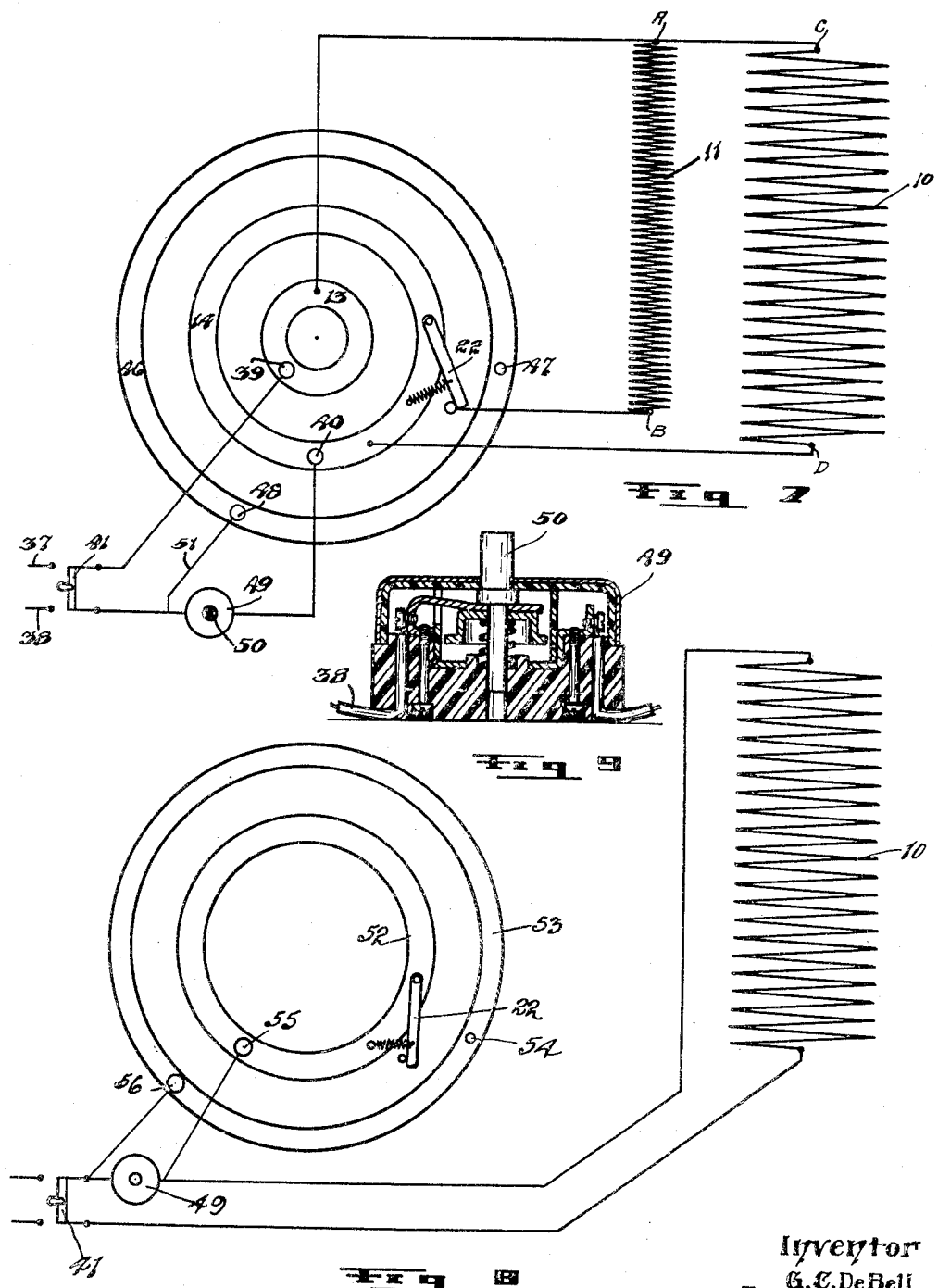

1,611,102

UNITED STATES PATENT OFFICE.

GEORGE C. DE BELL, OF WINNIPEG, MANITOBA, CANADA.

MOTOR-OVERLOAD CUT-OUT.

Application filed March 20, 1924. Serial No. 700,641.

The invention relates to improvements in motor overload cut outs and an object of the invention is to provide a means associated with the motor which will automatically cut off the source of electric current supply to the motor, should the motor, under running conditions, become overloaded.

A further object is to accomplish the above without utilizing fuses and other such well known contrivances which require constant attention and replacement.

A still further object is to provide a device which will operate continuously, that is without replacement of any parts, to cut off the source of current supply should the motor be overloaded.

A further object is to construct the device so that it can be installed as part of the regular equipment of a motor and without materially altering the existing structural arrangement thereof.

With the above more important objects in view the invention consists essentially in the arrangement and construction of parts hereinafter more particularly described, reference being had to the accompanying drawings in which:

Fig. 1 is an end view of a motor equipped with my invention.

Fig. 2 is a face view of one of the heads of the motor detached from the motor body and looking at the interior thereof.

Fig. 3 is a face view of certain parts of the motor which appear upon the removal of the head shown in Figure 2 and shows the disc and collector rings carried thereby.

Fig. 4 is an enlarged vertical sectional view at 4—4' Figure 1, the motor shaft being shown in side elevation.

Fig. 5 is an enlarged detailed rear view of the disc appearing in Figure 3 and showing the parts carried thereby and embodying the usual automatic cut out switch for the starting winding of the motor.

Fig. 6 is an enlarged detailed vertical sectional view through one of the brushes employed and parts associated therewith.

Fig. 7 is a wiring diagram showing the invention applied to a motor having a starting winding as well as the usual field winding.

Fig. 8 is a wiring diagram showing the invention applied to a motor having no starting winding but just the field winding and with the field winding stationary.

Fig. 9 is an enlarged detailed vertical sectional view through the momentary contact switch employed.

In the drawings like characters of reference indicate corresponding parts in the several figures.

The present invention is shown as applied to a 60 cycle, single phase alternating current motor as at present marketed by the Canadian General Electric Company and in so far as the present description is concerned, I have not considered it necessary to enter into a detailed description of the motor other than a short description and showing of the parts with which my invention is immediately associated.

The stator of the motor is the armature and the rotor is the field. The stator 1, (see Figure 4) is located between and securely fastened to similar closure end heads 2, the fastening being made by suitably positioned bolts 3. Each head is provided with legs 4 and 5 which form the support for the motor and the heads are cup shaped as best shown in Figures 4 and 6.

Each head provides a centrally positioned end bearing 6 for the motor shaft 7, the motor shaft carrying the rotating field 8. An oil cup 9 is associated with each head and feeds oil to the shaft.

The present motor is provided with the customary field winding 10 and starting winding or coil 11. These rotate with the rotor and I have not herein shown the details of such windings other than in the wiring diagram in Figure 7, as such windings are well understood by those familiar with the art.

The shaft 7, at the present time, carries an insulating disc 12 which rotates therewith and is housed within one of the heads 2 in a location spaced from the field and starting windings. This disc carries on its outer face, two insulated collecting rings 13 and 14. The inner side of the disc is fitted with a pair of metallic plates 15 and 16 which are electrically connected by pins 17 to the ring 14 and have their opposing ends separated one from the other by intervening insulating blocks 19 and 20, which blocks are in reality inward extensions of the disc.

To the plate 15 there is attached pivotally a pin 21 a semi-circular shaped cut out switch arm 22 for the starting winding and this switch has the free end thereof provided with a slot 23 concentric with the pin 21 and receiving a stop pin 24 carried by the plate 16. The switch arm 22 is under the influence of a spring 25, the tension of which can be adjusted by manipulating the pivot plate 26 and setting the same by means of the adjusting nut 27. The spring operates to hold the switch arm normally in the position shown in Figure 5 and also to resist the out swinging of the arm under the action of centrifugal force when the motor is running.

The free end of the switch arm is adapted normally, or in the inert condition of the rotor to make electrical contact with a receiving contact plate 28 which is mounted on the insulating block 20 and is electrically connected by a pin 29 to a terminal plate 30 insulated within the block 20 and provided with a binding screw 31. The insulating block 19 receives also a terminal plate 32 which is insulated by the block and which carries two terminals or binding screws 33 and 34. The plate 32 is connected by pins 35 to the inner ring 13. The plate 15 is provided with a terminal screw 36.

Referring now to the diagram in Figure 7.

It will be observed that the points A and B and those C and D, which are actually the terminals of the starting winding and the field winding, correspond with the binding screws 33 and 31 and 34 and 36 in Figure 5, that is to say, the binding screws 33 and 31 represent the terminals of the starting winding of the motor and those 34 and 36 represent the terminals of the field winding of the motor. The terminals A and C of the starting and field windings which correspond to the terminals 33 and 34 are in both instances connected to the inner ring 13, whilst the other terminals B and D of the starting and field windings which correspond to the screws 31 and 36 are connected to the ring 14, this condition being established when the motor is inert and by way of the cut out switch arm in so far as the starting winding is concerned.

The current supplied to the motor passes through the wires 37 and 38 and these wires connect with similar carbon brushes 39 and 40 which play continuously on the faces of the rings. A knife switch 41 or such like controls the current to the motor through the wires. The brushes, the details of which are best shown in Figure 6, embody an insulated body 42 which is carried by the motor head and which contains a metallic cylindrical cup 43 in which the carbon brush 44 slidably operates, the inner end of the brush playing on the ring and the outer end thereof being pressed towards the ring by a coiled spring 45. The feed wire is electrically connected to the brush in any suitable manner.

The above parts are all of ordinary construction, being at present found on the type of motor herein before stipulated and the arrangement is such that when the switch 41 is closed, the rotor being primarily inert, the current flows through both the starting and the field windings, the starting winding being of such a nature that it operates to initially very quickly rotate the rotor. Shortly after the rotor has been set in motion by the starting winding, it has gained considerable speed and the cut out switch arm 22 is thrown out by centrifugal force to pass out of contact with the plate 28, with the result that the starting winding is then thrown out of circuit and the motor thereafter continues to rotate under the influence of the field winding. Obviously if the speed of the motor be maintained, the cut out switch arm will remain in its out or disengaged position.

The invention which I have provided is embodied as additional equipment to the motor, embodying in the present instance, the parts hereinbefore disclosed and it operates to effectively and automatically cut off the supply of current through the feed wires 37 and 38 to the motor upon the motor being overloaded, it being here understood that the overload is applied in the usual manner through a belt or such like operated by the motor shaft. The cut out switch arm 22 is utilized to advantage in carrying out my invention.

In equipping a motor of this type, I provide an outer ring 46 which is carried by the disc 12 and is insulated from the inner ring 13 and the now intermediate ring 14. On the inner side of the disc 12 I locate a contact arm 47 which in the present instance is in the form of a spring. The contact arm is connected by pins 47' to the outer ring 46 and it is arranged such that upon the arm 22 swinging to its out position under the influence of centrifugal force, it will make contact with the arm 47. In addition to the customary carbon brushes 39 and 40 with which the motor is supplied, and which contact with the rings 13 and 14 respectively, I provide a further similar brush 48 which is carried by the head 2 and has the brush thereof continuously riding the outer face of the ring 46. I provide also a momentary contact switch 49 which can be of any approved design and of a nature such that when the push button 50 thereof is pressed down, it will electrically connect the wires leading thereto and when released will move up and disconnect the same. This momentary contact switch is introduced in the feed wire 38 leading from the source of supply to the intermediate ring 14. A feed wire 51 is connected to the wire 38 between the switches 41 and 49 and this wire leads to the brush 48.

The motor having been provided with my additional equipment operates in the following manner, reference being had in the present instance, to the wiring connection as shown diagrammatically in Figure 7 and it being here assumed that the switch 41 is closed.

The closing of this switch 41 does not at this time start the motor, for the reason that the switch 49 is open and the wire 51 only leads to the outer ring which is not at this time in electrical connection with any other part of the motor. To start the motor, one pushes down the button 50 of the switch 49 and this results in the excitation of both the starting and field windings and the consequent rotation of the rotor. When the motor has gained speed, the switch arm 22 flies out under centrifugal action and cuts out the starting winding and as it flies out comes in contact with the contact arm 47. When this occurs, the circuit is then closed to the field winding through the wire 51, the outer ring, the switch arm 22 and the intermediate ring. This circuit being closed the push button 50 can be released. The motor will then continue to rotate as the connection so established will be maintained under normal conditions due to the fact that the switch arm 22 will remain in contact with the spring arm 47. Should the motor, however, become overloaded, the overloading will effect a reduction in the speed of the shaft and this reduction in speed will cause the switch arm 22 to return to its inner position and in so doing break the previously established and maintained electrical connection between the outer and intermediate rings. The motor is accordingly electrically dead and comes to a stop.

The motor can be immediately started upon depressing the button 50, provided of course the load is diminished to permit of starting in the usual manner.

In Figure 8 I have shown diagrammatically, the application of the invention to a motor having the field stationary and the armature rotating and no starting winding. In such a case I provide two rings 52 and 53 which rotate with the armature, and the cut out switch arm 22 which is carried by the ring 52 is adapted shortly after the motor has started or reached its running speed, to engage with a point 54 which corresponds with the contact arm 47, Figure 7. The field is indicated at 10, the knife switch at 41 and the momentary contact switch at 49 as in the other figure. The brush 55 corresponds with that 40 and the brush 56 to that 48.

In this latter adaptation of the invention, if the field switches have been closed and the armature or rotor has gained speed sufficient to swing the switch arm 22 out into contact with the point 54, one can release the switch 49 and the circuit will remain closed through the field winding, the current passing from the inner ring to the outer ring by way of the switch arm and returning through the brush 56. Obviously when the speed of the motor is decreased by an overload, the switch arm 22 will swing in and cut out the circuit, with the result that the motor becomes dead.

Whilst I have described the invention particularly as associated with the Canadian General Electric motor, hereinbefore specified, it will be readily understood that I do not wish to be restricted to any such application as the said specified motor has herein simply been used as illustrative rather than as restricting the application.

A cut out switch arm, similar to that 22 shown and acting under the influence of centrifugal force is necessary as is also a ring corresponding to that 46 and a momentary contact switch similar to that 49, such parts being arranged to operate substantially in the manner as shown to cut off the electrical current leading to the motor when the same becomes overloaded.

What I claim as my invention is:—

1. The combination with a motor, of a momentary contact switch for initially closing the circuit through the motor winding and an automatic switch operated by the action of centrifugal force and adapted to maintain the circuit closed under the normal running conditions of the motor and to break the circuit upon the motor being overloaded.

2. The combination with a motor, of a momentary contact switch for initially closing the circuit through the motor winding and an automatic switch associated with the motor and operated by the action of centrifugal force and adapted to maintain the circuit closed under the normal running conditions of the motor and to break the circuit upon the motor being overloaded.

3. The combination with a motor, of a momentary contact switch for initially closing the circuit through the motor winding and an automatic switch adapted to maintain the circuit closed after the motor has gained speed and subsequent to the opening of the momentary contact switch, said automatic switch opening the circuit upon the motor being overloaded.

4. The combination with a motor, of a momentary contact switch for initially closing the circuit through the motor winding and an overload cut out switch actuated by centrifugal force and adapted to maintain the circuit closed upon the motor attaining working speed and to open the circuit upon the motor being overloaded.

5. The combination with a motor, of a momentary contact switch for initially closing the circuit through the motor winding and an overload cut out switch embodied as part of the motor structure and operated by the action of centrifugal force during the running of the motor to maintain the circuit closed upon the motor attaining running speed and to break the circuit upon the speed decreasing due to an overload.

6. The combination with a motor, having a starting and a field winding and a field cut out switch operating under the action of centrifugal force and adapted to throw the starting winding out of circuit upon the motor attaining its running speed, of a momentary contact switch adapted to initially close the circuit through both windings and electrical connections maintaining the field winding closed subsequent to the opening of the momentary contact switch, said connections embodying the cut out switch and the latter circuit being closed by the cut out switch in the normal running condition of the motor and opening by the cut out switch upon the motor being overloaded.

7. The combination with a motor having a starting and a field winding and a cut out switch operating by centrifugal action to disconnect the starting winding when the motor attains its normal running speed of a momentary contact switch serving to initially close the circuit through both of said windings and a contact positioned to be engaged by the cut out switch when the motor is running at normal speed and co-operating with said cut out switch to complete the circuit of the field winding, said circuit being automatically opened upon a decrease in the speed of the motor, owing to the disengagement of the cut out switch with said contact.

Signed at Winnipeg, this 21st day of February, 1924.

GEORGE C. DE BELL.